United States Patent

Röders et al.

(10) Patent No.: US 7,499,152 B2
(45) Date of Patent: Mar. 3, 2009

(54) METHOD FOR MEASURING A TOOL OF A MACHINE TOOL

(75) Inventors: Jürgen Röders, Hamburg (DE); Frank Eglins, Hamburg (DE)

(73) Assignee: P & L GmbH & Co. KG (DE)

( * ) Notice: Subject to any disclaimer, the term of this patent is extended or adjusted under 35 U.S.C. 154(b) by 240 days.

(21) Appl. No.: 11/118,120

(22) Filed: Apr. 28, 2005

(65) Prior Publication Data

US 2005/0264793 A1 Dec. 1, 2005

(30) Foreign Application Priority Data

Apr. 30, 2004 (DE) .................. 10 2004 021 254

(51) Int. Cl.
*G01N 1/00* (2006.01)

(52) U.S. Cl. ....................................... 356/36
(58) Field of Classification Search .................... 356/36
See application file for complete search history.

(56) References Cited

U.S. PATENT DOCUMENTS

| | | | |
|---|---|---|---|
| 4,330,274 A * | 5/1982 | Friedman et al. .............. 433/29 |
| 4,815,000 A | 3/1989 | Yoneda et al. | |
| 4,826,370 A | 5/1989 | Conradsson | |
| 4,869,813 A | 9/1989 | Bailey et al. | |
| 5,506,786 A * | 4/1996 | Itoh et al. ................... 700/175 |
| 5,655,354 A | 8/1997 | Baker et al. | |
| 5,825,017 A | 10/1998 | Pryor et al. | |
| 6,161,937 A * | 12/2000 | Rosenstatter ................. 362/109 |
| 6,449,526 B1 | 9/2002 | Sachs et al. | |
| 6,612,144 B2 * | 9/2003 | Domino ........................... 72/67 |
| 7,256,898 B2 * | 8/2007 | Bucher et al. ............... 356/614 |
| 2004/0166464 A1 * | 8/2004 | Schneider .................... 433/29 |
| 2004/0250982 A1 * | 12/2004 | Anderson et al. ........... 164/453 |
| 2005/0202364 A1 * | 9/2005 | Fornasari et al. .............. 433/88 |

FOREIGN PATENT DOCUMENTS

| | | |
|---|---|---|
| DE | 2520946 | 11/1976 |
| DE | 137547 | 9/1979 |
| DE | 3701124 A1 | 7/1988 |
| DE | 3837454 | 6/1989 |
| DE | 4028006 | 3/1992 |
| DE | 19828897 A1 | 12/1999 |
| EP | 0834378 A | 4/1998 |
| GB | 1290360 A | 9/1972 |
| JP | 04063663 | 2/1992 |

(Continued)

OTHER PUBLICATIONS

U.S. Appl. No. 10/567,973, filed Jun. 3, 2004, Roders.

(Continued)

*Primary Examiner*—Tarifur R. Chowdhury
*Assistant Examiner*—Isiaka O Akanbi
(74) *Attorney, Agent, or Firm*—Sheridan Ross P.C.

(57) ABSTRACT

The present invention relates to a method for measuring a tool 1 of a machine tool, the tool 1 being measured by means of a laser measurement device 2, 3, 4, characterized in that the tool 1 is sprayed with an oil- or grease-dissolving agent prior to laser measurement.

10 Claims, 2 Drawing Sheets

FOREIGN PATENT DOCUMENTS

| | | |
|---|---|---|
| NL | 1018943 C2 | 3/2003 |
| WO | WO 90/11162 | 10/1990 |
| WO | WO 03/026846 | 4/2003 |

OTHER PUBLICATIONS

U.S. Appl. No. 11/722,176, filed Nov. 18, 2005, Roders.

European Search Report for European Patent Application No. 05005766, mailed Jul. 14, 2005.

Weck, Manfred: Werkzeugmaschinen, Fertigungssystem, vol. 4, 4th edition, 1992, p. 354-355, Item 6.6 Measures for Reducing Chattering (English translation).

* cited by examiner

METHOD FOR MEASURING A TOOL OF A MACHINE TOOL

The present invention relates to a method according to the preamble of the main claim.

In detail, the present invention relates to a method for measuring a tool of a machine tool wherein the tool is measured by means of a laser measurement device.

In machine tools, laser light barriers are used for measuring the employed cutting or machining tools. Normally, length, diameter and/or geometry of the machining tool are measured. To this end, the machine moves the tool towards the laser light barrier until said barrier is interrupted by the machining tool, whereby the desired measure of the machining tool is sensed. In the case of rotating machining tools, e.g. millers, the tool is also rotated during measurement. The enveloping body created by the rotation of the machining tool is thereby sensed.

During machining on the machine tool, lubricants, emulsions or also oils, partly also as oil-mist lubrication, are normally used. These wet the workpiece and the machining tool to improve the machining operation. After the machining operation, residues of the employed lubricant will remain adhering to the machine tool. This is even the case when the machining tool is used at very high speeds. The surface tension of the lubricant prevents the lubricant from detaching from the machining tool.

Modern machine tools have a tool magazine from which the machine fetches the machining tool required for a machining operation. Subsequently, laser measurement is carried out, especially when the machining tools are not preset. After machining, the machining tool is again returned into the magazine after a fracture and/or wear control has possibly been carried out with the laser before.

When a machining tool is used for several machining operations, it is normally measured again before each operation. This enhances the machining accuracy because a renewed measurement is thereby performed directly before machining and the data of an older measurement need not be resorted to.

When a machining tool is measured that has already been used, the surface thereof is still wetted with a lubricant. In laser measurement, this leads to an increased variance of the measurement values due to optical effects and thus to an increased measuring inaccuracy and uncertainty. To avoid such an effect, the machining tool is blown at or off with a compressed-air nozzle in many machine tools prior to laser measurement. However, this compressed-air actuation of the tool does not produce satisfactory results in every application, so that the laser measurement is often prone to errors in many cases.

It is the object of the present invention to provide a method of the above-mentioned type which, while being of a simple construction and usable in a simple and operationally reliable manner, permits an error-free measurement of the tool while avoiding the drawbacks of the prior art.

This object is achieved according to the invention by the feature combination of the main claim; the subclaims show further advantageous configurations of the invention.

According to the invention, the tool is sprayed with an oil- or grease-dissolving agent prior to laser measurement.

The method of the invention is characterized by a number of considerable advantages. Since the tool is sprayed at with an oil- or grease-dissolving agent, the surface tension of the lubricant, the emulsion, the oil or the substances applied in the case of oil-mist lubrication is reduced. As a result, these agents can be removed from the tool, so that there is no longer any surface film interfering with the laser measurement. This enhances the measurement reliability quite considerably. Measurement errors that have been caused by the lubricants, emulsions, oils, etc. can by avoided in a reliable manner.

Preferably, a cleaner is sprayed on as the oil- or grease-dissolving agent. However, it is also possible to use a solvent, or the like. According to the invention it is important that the surface tension of the oil or lubricant film is reduced accordingly so that said film can detach from the tool.

It is of particular advantage that the oil- or grease-dissolving agent is sprayed onto the tool under pressure. This can e.g. be carried out by means of compressed air. It is thereby ensured that the cleaner or solvent is applied in a reliable manner to the surface of the tool.

It is of particular advantage that the tool is rotating at a reduced speed when the oil- or grease-dissolving agent is sprayed on. Furthermore, it is advantageous that the tool is rotated at an increased speed after the oil- or grease-dissolving agent has been sprayed on. For reducing the speed, it may be enough to turn off the drive of the tool-supporting spindle for a predetermined period of time, e.g. 8 to 10 seconds. The spindle speed is then lowered by the coasting of the spindle itself. After the spraying operation, the drive can be turned on again; a speed of 30,000 min$^{-1}$ or more has e.g. turned out to be advantageous. It is thereby avoided that an excessive rotational speed of the tool prevents the application of the cleaner or solvent during the spraying operation. This could e.g. be accomplished by means of an air cone or an air film on the surface of the tool that impairs the spraying operation. This effect is avoided by reducing the speed of the tool.

The increase in the speed after the spraying operation has the effect that the particles of the cleaner or solvent detach from the tool. This effect is also produced or enhanced by the compressed-air actuation of the cleaner or solvent. On the whole, combined positive effects can thereby be achieved.

After the spraying operation and the increase in speed, the oil- or grease-dissolving agent (cleaner, solvent) evaporates on the surface of the tool within a short period of time. The surface of the tool is thus dry and free from any lubricant film, so that the subsequent laser measurement can be carried out without any errors and without any undesired optical effects.

CALLINA 2201 of Shell Macron GmbH may e.g. be used as the cleaner or solvent. This is a cold cleaner or a hydrocarbon cleaner based on selected isoparaffins. This cleaner thoroughly removes oily machining residues and dirt and can particularly be used in the case of water-mixed cooling lubricants.

The invention shall now be explained with the help of schematic illustrations, of which:

Figure 1:
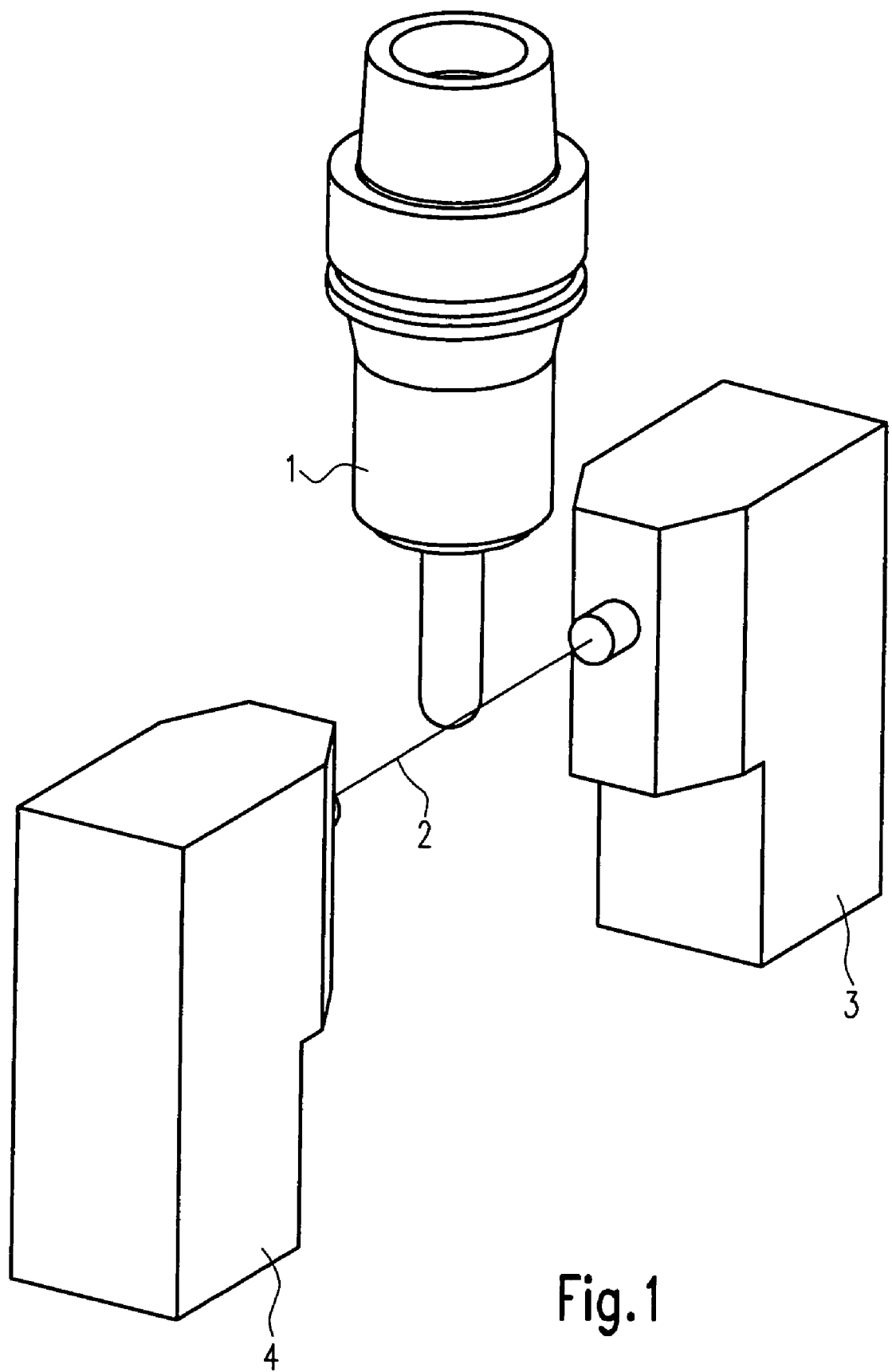
FIG. 1 is a schematic illustration of a laser measurement device.

FIG. 1 is a very schematic illustration of a tool 1 which is only illustrated by way of its envelope curve and is known in its construction from the prior art. The tool 1 is scanned by means of a laser beam 2 of a laser measurement device (transmitter 3 and receiver 4).

Figure 2:
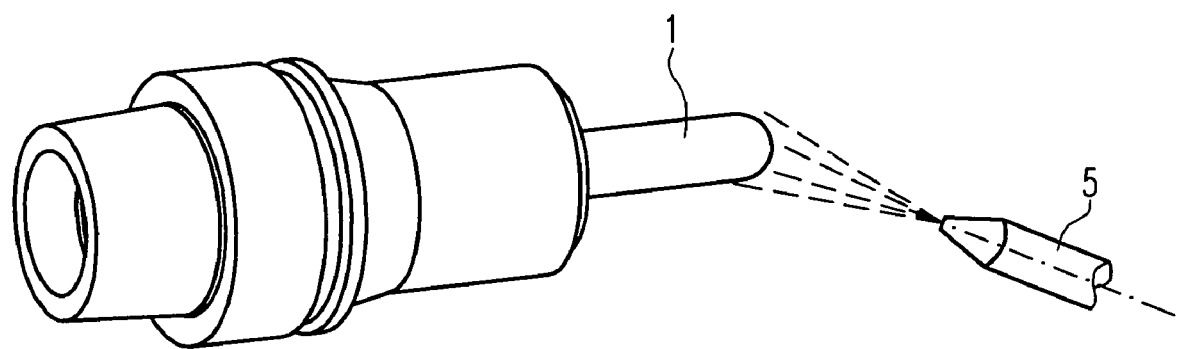
FIG. 2 is a schematic illustration showing the application of the oil- or grease-dissolving agent to the tool.

FIG. 2 is a schematic illustration showing a nozzle 5 from which an oil- or grease-dissolving agent (cleaner, solvent) is sprayed onto tool 1.

The method of the invention can be employed in every cutting machine or machine tool where a tool is measured. Measurement of the tool is not limited to a laser measurement device. Rather, other optical measuring methods can also be employed. It is also possible to use the method of the invention in other contact-type measuring methods or other contactless measuring methods.

Furthermore, the method according to the invention can be used in an automated manner, either in each measurement of a tool or only in predetermined measuring operations.

The invention claimed is:

1. A method of measuring a machine tool comprising:
   a) contacting the tool with an oil or grease-dissolving agent, to form a cleaned tool, and
   b) thereafter measuring the cleaned tool with a laser measurement device, the laser measurement device being positioned at a point external to the tool and scanning an external surface of the tool, wherein the contacting step comprises rotating the tool as the tool is contacted with the agent and wherein the tool is rotated, during the contacting step, at a reduced speed relative to a speed of rotation achieved during normal operation of the tool.

2. The method of claim 1, wherein the agent is a cleaner and wherein steps (a) and (b) occur during machining of a selected workpiece.

3. The method of claim 1, wherein the agent is a solvent and wherein steps (a) and (b) occur during machining of a selected workpiece.

4. The method of claim 1, wherein the contacting step comprises spraying the agent onto the tool.

5. The method of claim 4, wherein compressed air is used to spray the agent onto the tool.

6. The method of claim 1, further comprising the step of increasing rotation speed of the tool after the contacting step.

7. The method of claim 1, wherein step (a) is performed during machining of a workpiece by the tool and wherein at least one of a length, diameter, and geometry of the tool is measured in step (b).

8. A method, comprising:
   (a) contacting a machine tool with a first work surface in the presence of at least one of a lubricant and emulsion to form a fouled machine tool, the fouled machine tool comprising deposits of the at least one of a lubricant and emulsion;
   (b) cleaning the fouled tool with a liquid agent to remove substantially the at least one of a lubricant and emulsion to form a cleaned tool, wherein step (b) comprises the sub-steps:
      (B1) spraying the liquid agent under pressure onto the fouled tool; and
      (B2) rotating the fouled machine tool after step (B1) to remove substantially the at least one of a lubricant and emulsion and form the cleaned tool and wherein, in step (B2). a speed of rotation of the machine tool is less than a speed of rotation of the machine tool in step (a);
   (c) thereafter sensing, with light, at least one of a length, diameter, and geometry of the cleaned tool; and
   (d) after step (c), contacting the cleaned tool with a second work surface in the presence of the at least one of a lubricant and emulsion.

9. The method of claim 8, wherein the liquid agent dissolves the at least one of a lubricant and emulsion and wherein the light is positioned and from a point external to the machine tool.

10. The method of claim 8, wherein the machine tool is rotated during step (B1).

* * * * *